US011085780B2

(12) United States Patent
Matsuoka et al.

(10) Patent No.: US 11,085,780 B2
(45) Date of Patent: Aug. 10, 2021

(54) PICKUP SYSTEM AND METHOD FOR CONTROLLING PICKUP SYSTEM

(71) Applicant: Toyota Jidosha Kabushiki Kaisha, Toyota (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 16/227,265

(22) Filed: Dec. 20, 2018

(65) Prior Publication Data

US 2019/0195643 A1 Jun. 27, 2019

(30) Foreign Application Priority Data

Dec. 26, 2017 (JP) ............................ JP2017-250205

(51) Int. Cl.
*G01C 21/34* (2006.01)
*G06Q 10/08* (2012.01)
*G05D 1/00* (2006.01)

(52) U.S. Cl.
CPC ....... *G01C 21/3438* (2013.01); *G05D 1/0088* (2013.01); *G06Q 10/0833* (2013.01); *G05D 2201/0213* (2013.01); *G06Q 10/087* (2013.01)

(58) Field of Classification Search
CPC .............. G01C 21/3438; G01C 21/343; G01C 21/3407; G06Q 10/0833; G06Q 10/087; G05D 1/0088; G05D 2201/02163; G05D 1/0295; G05D 1/0246; G05D 1/0287; G05D 2201/0216
See application file for complete search history.

(56) References Cited

U.S. PATENT DOCUMENTS

| | | | | |
|---|---|---|---|---|
| 6,335,702 | B1 | 1/2002 | Itoh et al. | |
| 9,256,852 | B1 * | 2/2016 | Myllymaki | G06Q 10/083 |
| 9,552,564 | B1 * | 1/2017 | Martenis | G06Q 10/083 |
| 9,796,529 | B1 * | 10/2017 | Hoareau | G06Q 10/08 |
| 2002/0044084 | A1 | 4/2002 | Itoh et al. | |
| 2015/0006005 | A1 * | 1/2015 | Yu | G06Q 50/28 701/22 |
| 2019/0138988 | A1 * | 5/2019 | High | B64C 39/02 |

FOREIGN PATENT DOCUMENTS

| | | |
|---|---|---|
| JP | H10281788 A | 10/1998 |
| WO | 2016/002527 A1 | 1/2016 |

* cited by examiner

*Primary Examiner* — Thomas Ingram
(74) *Attorney, Agent, or Firm* — Dinsmore & Shohl LLP

(57) ABSTRACT

A pickup system for picking up a product using a vehicle having an autonomous travelling function includes a communication unit configured to accept a pickup request from a user, a travel control unit configured to cause the vehicle to autonomously travel to a user position specified in the pickup request accepted through the communication unit, and an informing unit configured to inform the user that, when the vehicle arrives at the user position, the arrived vehicle is a vehicle that is to pick up a product in response to the pickup request.

6 Claims, 11 Drawing Sheets

Mr./Ms. A thank you for waiting.
Please load product.

100
100A
120

PICKUP SYSTEM AND METHOD FOR CONTROLLING PICKUP SYSTEM

CROSS-REFERENCE TO RELATED APPLICATION

This application claims priority to Japanese Patent Application No. 2017-250205 filed on Dec. 26, 2017, incorporated herein by reference in its entirety.

BACKGROUND

The present disclosure relates to a pickup system for picking up products and a method for controlling a pickup system.

Japanese Laid-Open Patent Publication No. 10-281788 describes a system that provides a driver with detailed information such as pickup and delivery routes of a product, an address, and a contact address, and other information necessary for picking up and delivering the product such as a delivery state and a pickup state to increase the efficiency of picking up the product.

In recent years, consideration has been made to use a vehicle having an autonomous travelling function to pick up products in an unattended situation without involving manpower. When picking up products using the vehicle with the autonomous travelling function, no driver is riding in the vehicle. For this reason, it may be difficult for the user to ascertain whether the product is to be loaded on the vehicle.

SUMMARY

It is an object of the present disclosure to provide a pickup system that allows a user to smoothly load a product onto a vehicle that is unattended and picks up products. It is also an object of the present disclosure to provide a method for controlling the pickup system.

To achieve the above object, a pickup system is for picking up a product using a vehicle having an autonomous travelling function. The pickup system includes a communication unit configured to accept a pickup request from a user, a travel control unit configured to cause the vehicle to autonomously travel to a user position specified in the pickup request accepted through the communication unit, and an informing unit configured to inform the user that, when the vehicle arrives at the user position, the arrived vehicle is a vehicle that is to pick up a product in response to the pickup request.

To achieve the above object, a method for controlling a pickup system for picking up a product using a vehicle having an autonomous travelling function includes causing the pickup system to accept a pickup request from a user, cause the vehicle to autonomously travel to a user position specified in the accepted pickup request, and inform the user that, when the vehicle arrives at the user position, the arrived vehicle is a vehicle that is to pick up a product in response to the pickup request.

To achieve the above object, a pickup system is for picking up a product using a vehicle having an autonomous travelling function. The pickup system includes circuitry. The circuitry is configured to accept a pickup request from a user, cause the vehicle to autonomously travel to a user position specified in the accepted pickup request, and inform the user that, when the vehicle arrives at the user position, the arrived vehicle is a vehicle that is to pick up a product in response to the pickup request.

BRIEF DESCRIPTION OF THE DRAWINGS

The disclosure, together with objects and advantages thereof, may best be understood by reference to the following description of the embodiments described herein together with the accompanying drawings in which.

DETAILED DESCRIPTION

First Embodiment

Hereinafter, a first embodiment of a pickup system will be described.

Figure 1:
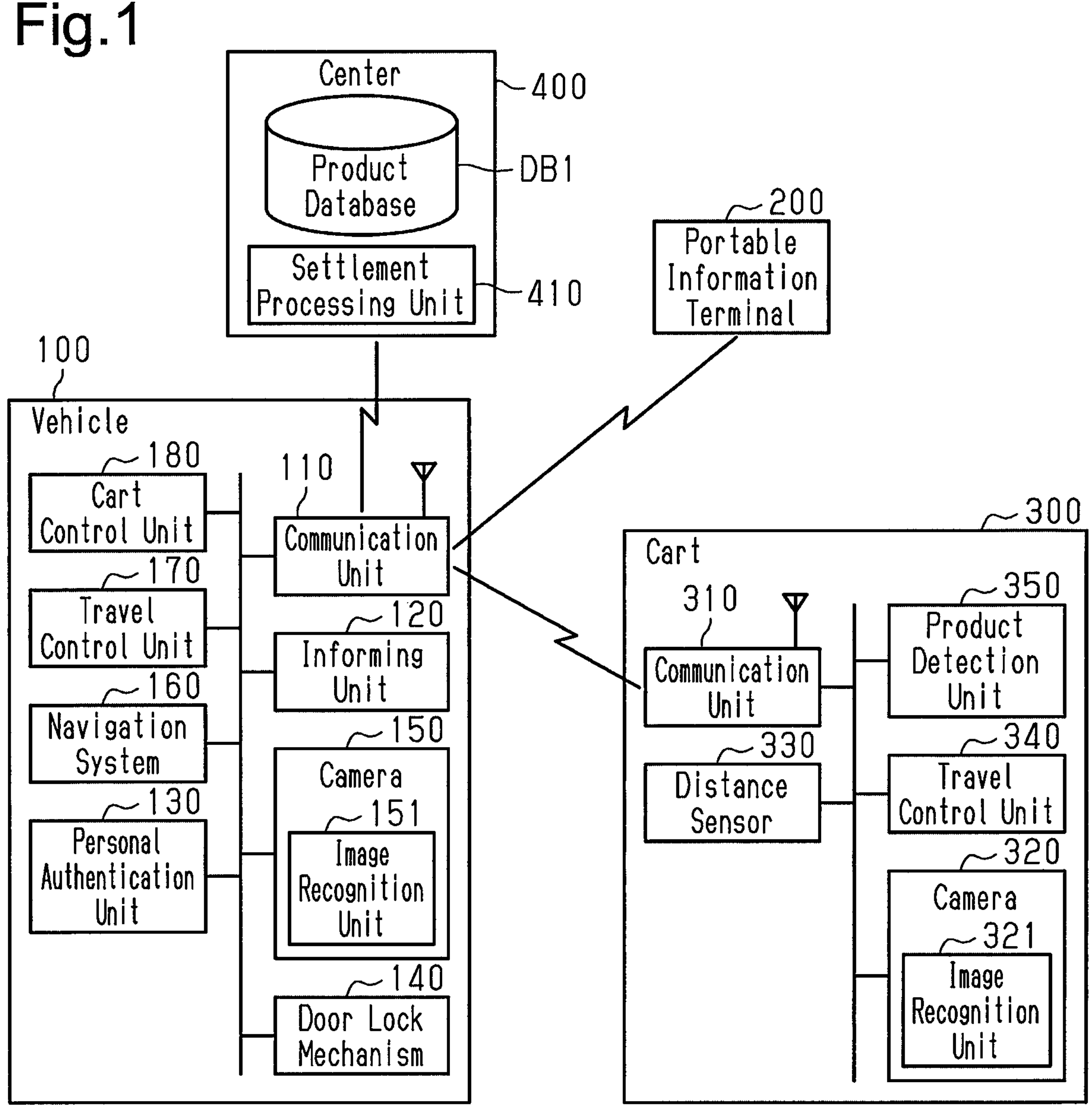
FIG. 1 is a block diagram showing a schematic configuration of a pickup system according to a first embodiment.

As shown in FIG. 1, the pickup system of the first embodiment arranges a vehicle to a position of a user, who is an exhibitor of a product, through operation of a portable information terminal. In this system, after the user loads the product on the vehicle, the vehicle autonomously travels to a selling area of the product to sell the product.

A vehicle 100 includes a communication unit 110, an informing unit 120, a personal authentication unit 130, a door lock mechanism 140, a camera 150, a navigation system 160, a travel control unit 170, and a cart control unit 180.

The communication unit 110 is configured to be capable of communicating with a portable information terminal 200 and receiving a request for arrangement of the vehicle 100 from the portable information terminal 200.

Figure 2:
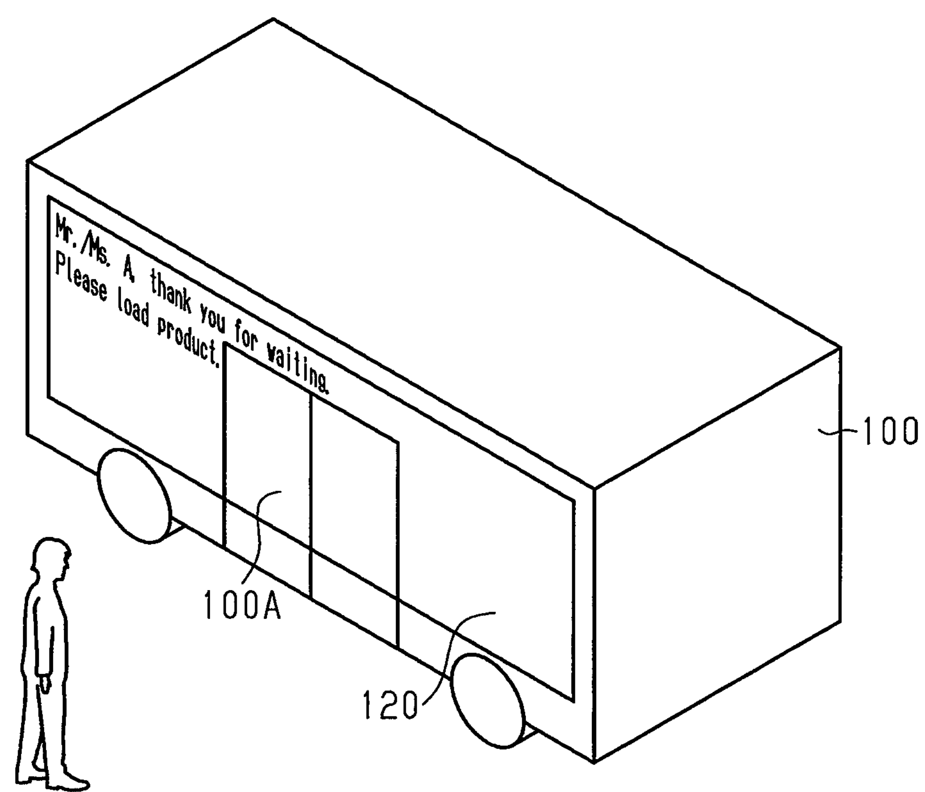
FIG. 2 is a schematic diagram showing an example of information provided when a vehicle arrives at a position of a user.

The informing unit 120 is arranged on an exterior surface of the vehicle 100 to provide a user with various kinds of guidance information when the vehicle 100 arrives at the position of the user. In the example shown in FIG. 2, when the vehicle 100 arrives at the position of the user, the informing unit 120 provides information prompting the user to load the product on the vehicle 100 together with the name of the user (in this example, “Mr./Ms. A”).

The personal authentication unit 130 performs personal authentication when a passenger gets on the vehicle 100. At this time, vein authentication, face authentication, iris authentication, or the like is used to authenticate the passenger.

The door lock mechanism 140 unlocks the vehicle door and permits the passenger to get on the vehicle 100 when the personal authentication of the passenger is completed by the personal authentication unit 130.

The camera 150 captures an image of the vehicle interior, and an image recognition unit 151 performs an image recognition process on the captured image to detect the position of the passenger riding on the vehicle 100.

The navigation system 160 recognizes the current position of the vehicle 100 and sets, for example, a destination of the vehicle 100 and a route on which the vehicle 100 autonomously travels based on map data.

The travel control unit 170 controls the autonomous travelling of the vehicle 100 and causes the vehicle 100 to travel in accordance with the travel route set by the navigation system 160.

The cart control unit 180 is configured to be capable of communicating with carts 300 arranged in the vehicle interior, and controls the movement of the carts 300 in the vehicle interior as well as the arrangement of the carts 300 in the vehicle interior.

Each of the carts 300 includes a communication unit 310, a camera 320, a distance sensor 330, a travel control unit 340, and a product detection unit 350.

The communication unit 310 is configured to be capable of communicating with the communication unit 110 of the vehicle 100 and acquires information on the movement control of the cart 300 from the cart control unit 180.

The camera 320 captures an image of the vehicle interior from the viewpoint of the cart 300. An image recognition unit 321 performs an image recognition process on the captured image to detect the position of the passenger around the cart 300 including the camera 320.

The distance sensor 330 is a non-contact type sensor and detects a distance between the passenger detected by the camera 320 and the cart 300 including the camera 320.

The travel control unit 340 controls autonomous travelling of the cart 300 so as to maintain a predetermined distance between a passenger detected by the distance sensor 330 and the cart 300 including the distance sensor 330.

The product detection unit 350 detects whether a product is loaded onto the cart 300 and detects loading of a product onto the cart 300 including the product detection unit 350 and removal of the product from the cart 300.

The communication unit 110 of the vehicle 100 is configured to be capable of communicating with a center 400. The center 400 manages information on the settlement of a product.

The center 400 includes a product database DB1 and a settlement processing unit 410. The product database DB1 associates, for example, the kind of product, the price, the review information of an exhibitor, and personal recommendation information with each other. The review information is, for example, a sales history including product sales performance of the exhibitor. The recommendation information includes, for example, the types of products recommended to the person associated with the recommendation information and the recommendation level. When receiving from the vehicle 100 information that the sales contract for a product has been established, the settlement processing unit 410 processes the settlement of the product with reference to the product database DB1 and updates the review information on the exhibitor exhibiting the product.

Various types of control devices included in the pickup system, for example, the travel control unit 170 and the cart control unit 180 of the vehicle 100, the travel control unit 340 of the cart 300, and the settlement processing unit 410 of the center 400, may be configured to be circuitry including 1) one or more processors that operate according to a computer program (software) 2) one or more dedicated hardware circuits such as an application specific integrated circuit (ASIC) that executes at least some of the various processes, or 3) a combination of these. The processor includes a CPU as well as a memory such as a RAM and a ROM. The memory stores program codes or commands configured to cause the CPU to execute the processes. The memory, or a computer readable medium, includes various available media that can be accessed with a general-purpose or dedicated computer.

A flow of processes when the navigation system 160 sets the travel route of the vehicle 100 will be described.

Figure 3:
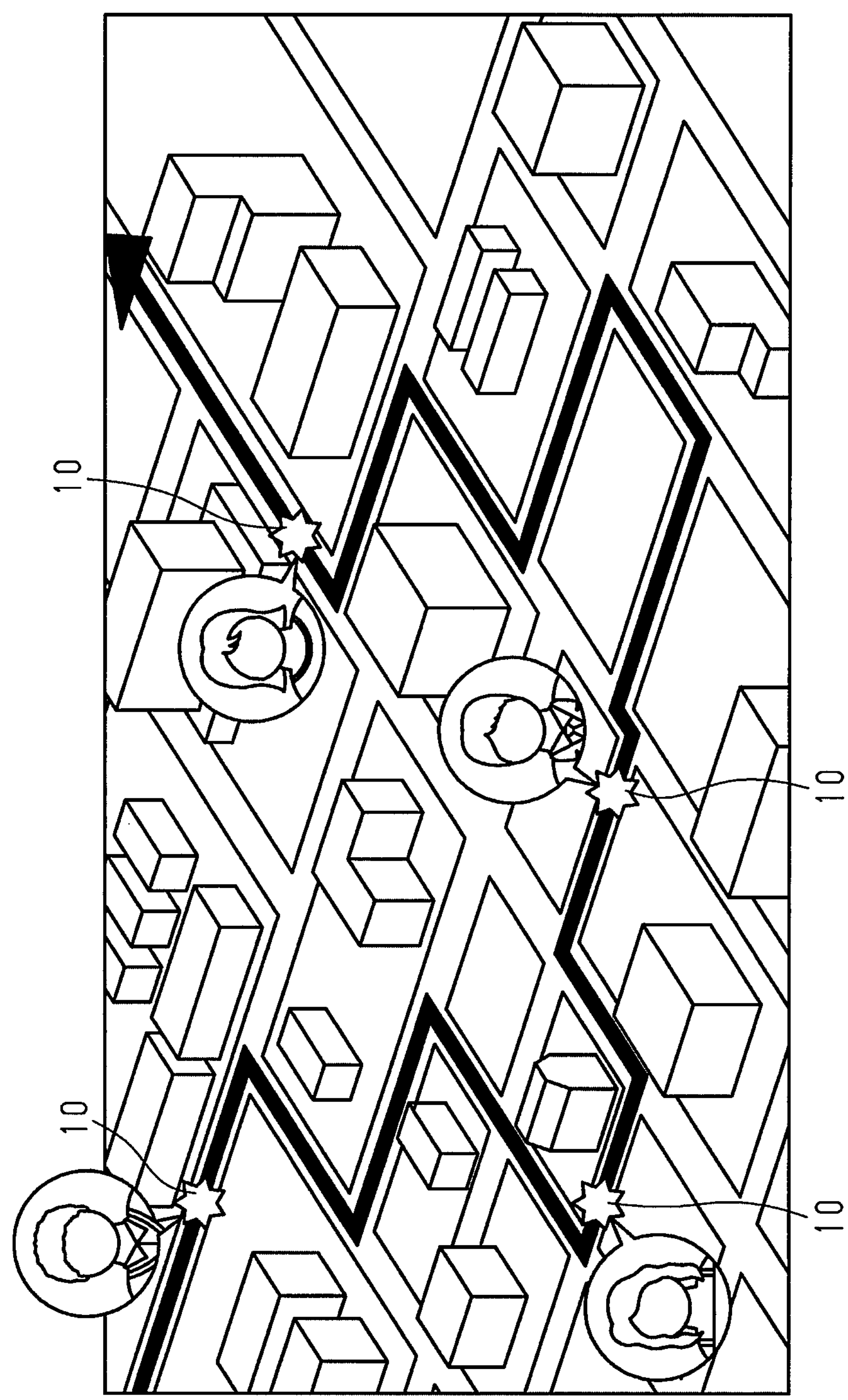
FIG. 3 is a schematic diagram showing an example of a travel route of the vehicle.

As shown in FIG. 3, the navigation system 160 first acquires recommendation information for each user from the product data managed in the product database DB1 of the center 400. Next, the navigation system 160 specifies one or more persons 10 to whom the product is highly recommended based on the acquired recommendation information. The navigation system 160 sets the travel route of the vehicle 100 so as to include the position of the specified person 10. That is, the navigation system 160 sets the travel route of the vehicle 100 so that the vehicle 100 travels through the position of the specified person 10.

Figure 4:
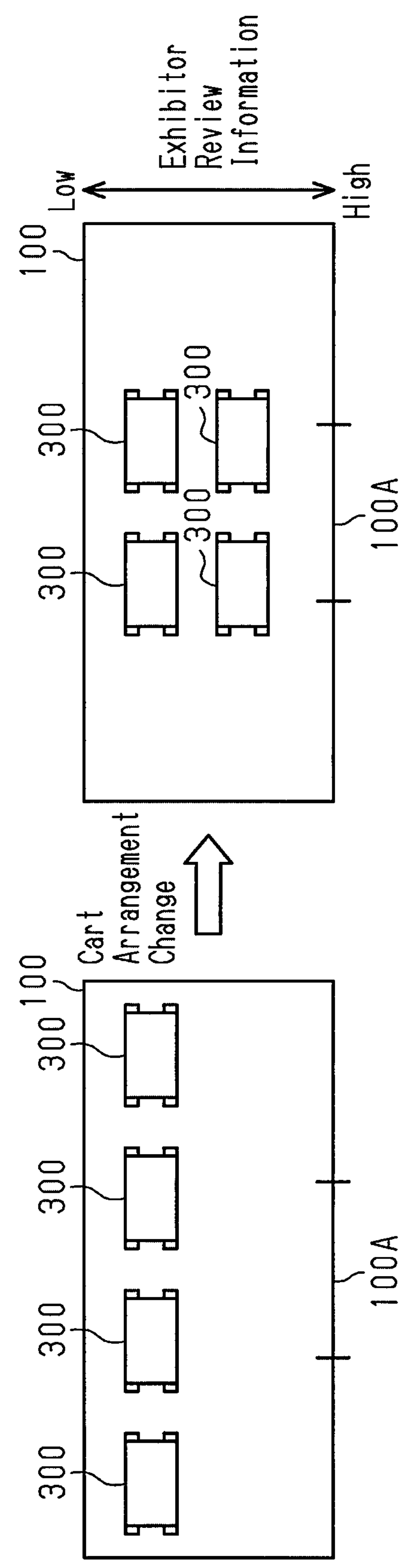
FIG. 4 is a schematic diagram showing an example of change in arrangement of carts in a vehicle interior.

As shown in FIG. 4, while the vehicle 100 is traveling in accordance with the travel route, the cart control unit 180 acquires the review information of each exhibitor from the product data managed by the center 400 in the product database DB1. The cart control unit 180 controls the arrangement of the carts 300 in the vehicle interior based on the acquired review information of each exhibitor. Specifically, the cart control unit 180 changes the arrangement of the carts 300 so that a cart 300 that is loaded with a product having high sales performance is arranged closer to an entrance 100A of the vehicle 100 than a cart 300 that is loaded with a product having low sales performance. That is, as the sales performance of a product loaded on a cart 300 becomes higher, the cart 300 is arranged closer to the entrance 100A of the vehicle 100.

In the first embodiment, a flow of processes when a user, who is an exhibitor of a product, loads the product on the vehicle 100 will be described.

Figure 5:
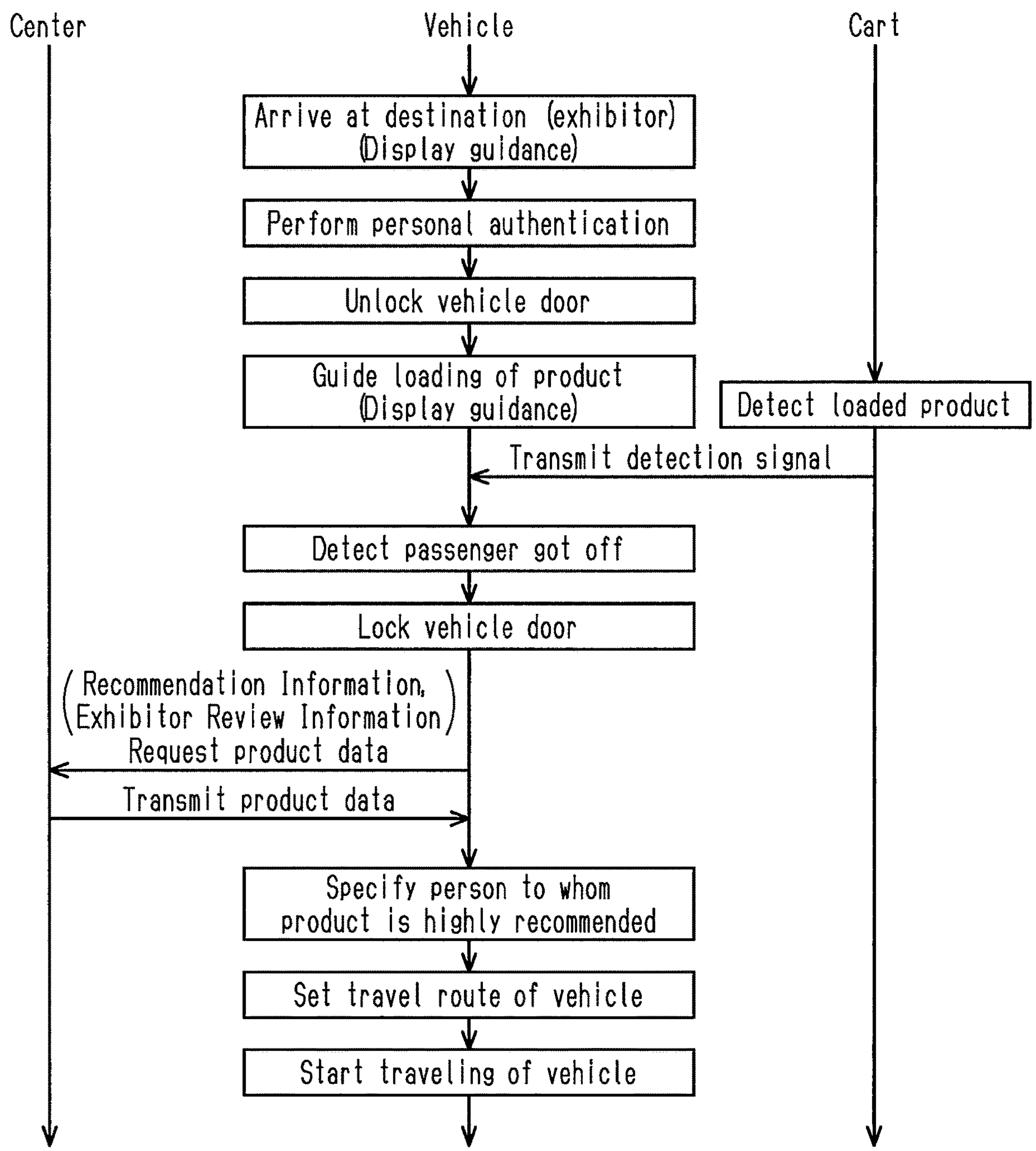
FIG. 5 is a sequence chart showing a flow of processes when a user, or an exhibitor of a product, loads the product onto a vehicle in the pickup system of FIG. 1.

As shown in FIG. 5, when arriving at the position of a user, which is a destination or a transit point, the vehicle 100 provides the user with various kinds of guidance information through the informing unit 120. For example, the vehicle 100 provides information indicating that the vehicle 100 is to pick up a product for the user.

Then, the vehicle 100 determines whether the user is permitted to get on the vehicle 100 through the personal authentication unit 130, that is, performs the personal authentication on the user.

The vehicle 100 compares the information acquired from the user by the vehicle 100 and information registered in advance. When the personal authentication is completed based on this comparison, the vehicle 100 unlocks the vehicle door and permits the user to get on the vehicle 100. When the personal authentication is not completed, the vehicle 100 continues to lock the vehicle door.

The vehicle 100 then guides the user to load the product through the informing unit 120. As an example of a guiding mode of loading a product, the user may be informed of the position of the cart 300 that is to be loaded with the product. As another example of a guiding mode of loading a product, the vehicle 100 detects the position of a user and brings a cart 300 assigned to the user, that is, a cart 300 that is to be loaded with the product, closer to the user than the other carts 300.

Upon detecting that the product is loaded onto the cart 300 through the product detection unit 350, the cart 300 transmits a detection signal to the vehicle 100.

When the loading of the product onto the cart 300 is completed and the user, or the passenger, gets off the vehicle 100, the vehicle 100 switches the vehicle door to the locked state through the door lock mechanism 140.

Then, the vehicle 100 sends a request for the product data managed in the product database DB1 from the center 400. Upon receiving the product data from the center 400, the vehicle 100 acquires personal recommendation information and the review information on the exhibitor from the received product data.

Furthermore, based on the personal recommendation information acquired as described above, the vehicle 100 specifies a person to whom the product loaded on the vehicle 100 is highly recommended from people around the vehicle 100. The vehicle 100 sets the travel route of the vehicle 100 so as to include the position of the specified person and then starts the travelling of the vehicle 100 in accordance with the travel route.

In the first embodiment, a flow of processes when the vehicle 100 arrives at the selling area of the product and sells the product will be described.

Figure 6:
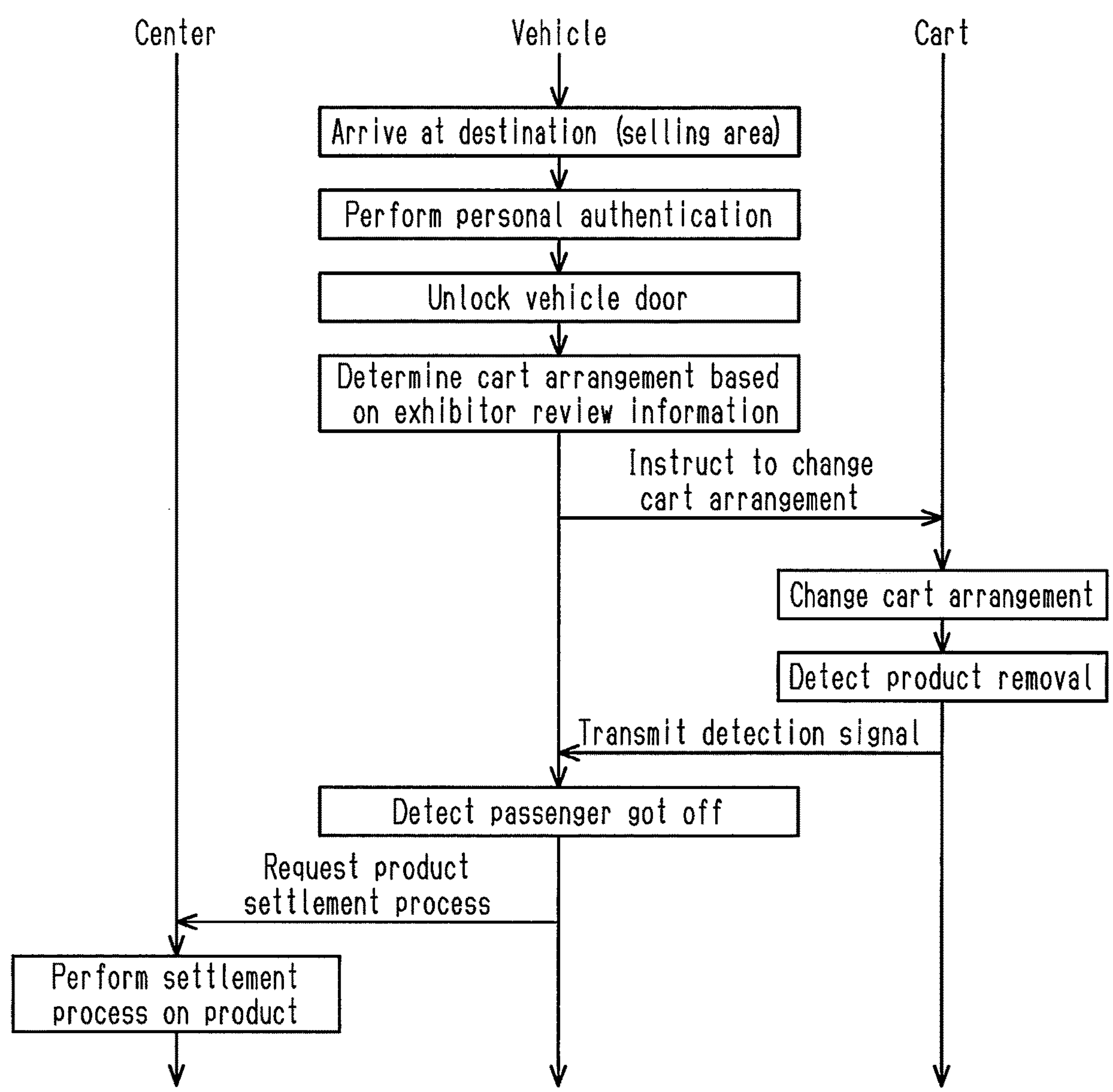
FIG. 6 is a sequence chart showing a flow of processes when a vehicle arrives at a selling area of the product to sell the product in the pickup system of FIG. 1.

As shown in FIG. 6, when arriving at the selling area of the product, or the destination, the vehicle 100 executes the personal authentication through the personal authentication unit 130 with respect to a person who is located around the vehicle 100 and wishes to purchase the product.

When the personal authentication is performed on the person who wishes to purchase the product, the vehicle 100 releases the vehicle door from the locked state and permits the person to get on the vehicle 100. At this time, the vehicle 100 determines the arrangement of the cart 300 loaded with the product and instructs the cart 300 to change the arrangement based on the review information of the exhibitor.

Upon receiving an instruction to change the arrangement from the vehicle 100, the cart 300 changes the arrangement in accordance with the instruction from the vehicle 100. Specifically, as described above, for example, the arrangement of carts 300 is changed such that a cart 300 that is loaded with a product having high sales performance is arranged closer to the entrance 100A of the vehicle 100 than a cart 300 that is loaded with a product having low sales performance.

Alternatively, the arrangement of carts 300 may be controlled based on sales priority. Specifically, the cart control unit 180 changes the arrangement of carts 300 such that a cart 300 that is loaded with a product having a high sales priority is arranged closer to the entrance 100A of the vehicle 100 than a cart 300 that is loaded with a product having a low sales priority. The sales priority may be determined in accordance with, for example, the sales performance or popularity of the product obtained based on the review information of the exhibitor or may be set in advance by the exhibitor for the product.

In addition, when detecting the removal of the product from the cart 300 through the product detection unit 350, the cart 300 transmits a detection signal to the vehicle 100.

After receiving the detection signal indicating the removal of the product from the cart 300, when the vehicle 100 detects that the passenger got off the vehicle 100 through the camera 320, the vehicle 100 sends a request to the center 400 to perform a settlement process on the product removed from the cart 300.

The center 400 performs the settlement process on the sales transaction of the product requested for the settlement process from the vehicle 100.

As described above, the first embodiment has the following advantages.

(1) When the vehicle 100 arrives at the position of the user, the informing unit 120 informs the user that the vehicle 100 is to pick up a product in response to a pickup request. With the autonomous traveling control and provision of information, the user can effectively load the product on the vehicle 100 that is unattended and picks up products.

(2) The informing unit 120 informs the user of the location where the product is to be loaded in the vehicle 100. With the provision of information, the user can more effectively load the product.

(3) When the vehicle 100 arrives at the selling area of the product, the cart control unit 180 controls the arrangement of the carts 300 based on the review information of the exhibitor set for the product. Thus, even when the vehicle 100 is unattended and sells products, the user can effectively sell a product.

Second Embodiment

A second embodiment of a pickup system will now be described. The second embodiment is different from the first embodiment in that the location where a product is to be loaded in the vehicle 100 is displayed as guidance based on review information of the exhibitor. Therefore, in the following description, the configuration that is different from the first embodiment will be mainly explained, and redundant explanation of the configuration same as or equivalent to the configuration in the first embodiment will be omitted.

Figure 7:
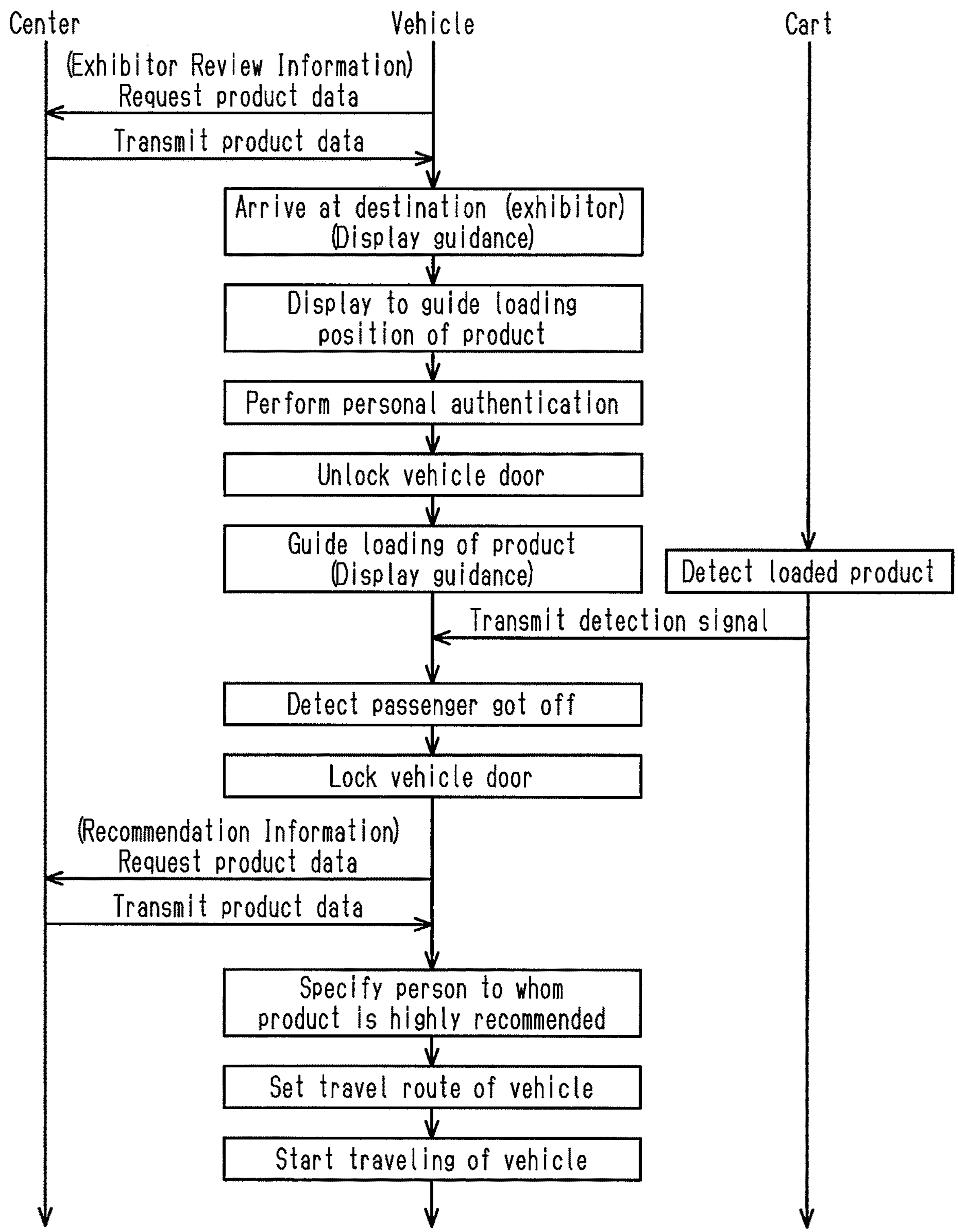
FIG. 7 is a sequence chart showing a flow of processes when a user, or an exhibitor of a product, loads the product onto a vehicle in a pickup system according to a second embodiment.

As shown in FIG. 7, the vehicle 100 sends a request to the center 400 for the product data at a point in time before arriving at the location of an exhibitor, or the destination. The vehicle 100 acquires the review information of the user, or the exhibitor, from the product data received from the center 400. When arriving at the position of the user, or the destination, the vehicle 100 provides the user with various kinds of guidance information through the informing unit 120. The provision of the guidance information includes a guidance display of the loading position of the product in the vehicle 100 based on the review information of the user.

Subsequently, the vehicle 100 performs the personal authentication on the user through the personal authentication unit 130.

When the personal authentication is completed by comparison with the information registered in advance, the vehicle 100 unlocks the vehicle door and permits the user to get on the vehicle 100. When the personal authentication is not completed, the vehicle 100 continues to lock the vehicle door.

The vehicle 100 then guides the loading of the product through the informing unit 120. Here, as an example of a mode of guiding the loading of the product, the user may be informed of the position of the cart 300 that is to be loaded with the product. At this time, for example, the vehicle 100 refers to the review information of the user and controls the positions of the carts 300 so that the loading position of a product having high sales performance is closer to the entrance of the vehicle 100 than the loading position of a product having low sales performance. Alternatively, for example, the vehicle 100 refers to the review information of the user and controls the positions of the carts 300 so that the loading position of products having high sales performance and the loading position of products having low sales performance are alternately lined from the entrance of the vehicle 100. Thereafter, the vehicle 100 informs the user of the position of the cart 300 that is to be loaded with the product.

The loading priority may be set for each product based on the review information of each exhibitor. The cart control unit 180 controls the arrangement of the cart 300 that is to be loaded with the product in the vehicle interior based on the loading priority. Specifically, the cart control unit 180 changes the arrangement of carts 300 such that a cart 300 that is to be loaded with a product having a high loading priority is arranged closer to the entrance 100A of the vehicle 100 than a cart 300 that is to be loaded with a product having a low loading priority. For this reason, priority is given to the loading of a product having higher potential for selling on the vehicle. That is, as the loading priority of a product loaded on the cart 300 becomes higher, the cart 300 is arranged closer to the entrance 100A of the vehicle 100. The loading priority may be determined in accordance with, for example, the sales performance or popularity of a product obtained based on the review information of the exhibitor or may be set in advance by the exhibitor for the product.

Upon detecting that the product is loaded onto the cart 300 through the product detection unit 350, the cart 300 transmits a detection signal to the vehicle 100.

When the loading of the product onto the cart 300 is completed and the user, or the passenger, gets off the vehicle 100, the vehicle 100 switches the vehicle door to the locked state through the door lock mechanism 140.

Thereafter, the vehicle 100 sends a request to the center 400 for the product data managed in the product database DB1. Upon receiving the product data from the center 400, the vehicle 100 receives personal recommendation information from the received product data.

The vehicle 100 specifies a person to whom the product is highly recommended among people around the vehicle 100 based on the personal recommendation information received in this manner. The vehicle 100 sets the travel route of the vehicle 100 so as to include the position of the specified person and then starts the travelling of the vehicle 100 in accordance with the travel route.

As described above, the second embodiment has the following advantage in addition to the advantages (1) to (3) of the first embodiment.

(4) When the vehicle 100 arrives at the position of the user, or the exhibitor of a product, the loading position of the product on the vehicle 100 is informed based on the review information of the exhibitor set for the product. This may have the effect of providing an arrangement of products that enhances the sales of products.

Third Embodiment

A third embodiment of a pickup system will now be described. The third embodiment is different from the first embodiment in that a cart that is to be loaded with the product issues an notification when the user, or the exhibitor of the product, loads the product on the vehicle. Therefore, in the following description, the configuration that is different from the first embodiment will be mainly explained, and redundant explanation of the configuration same as or equivalent to the configuration in the first embodiment will be omitted.

Figure 8:
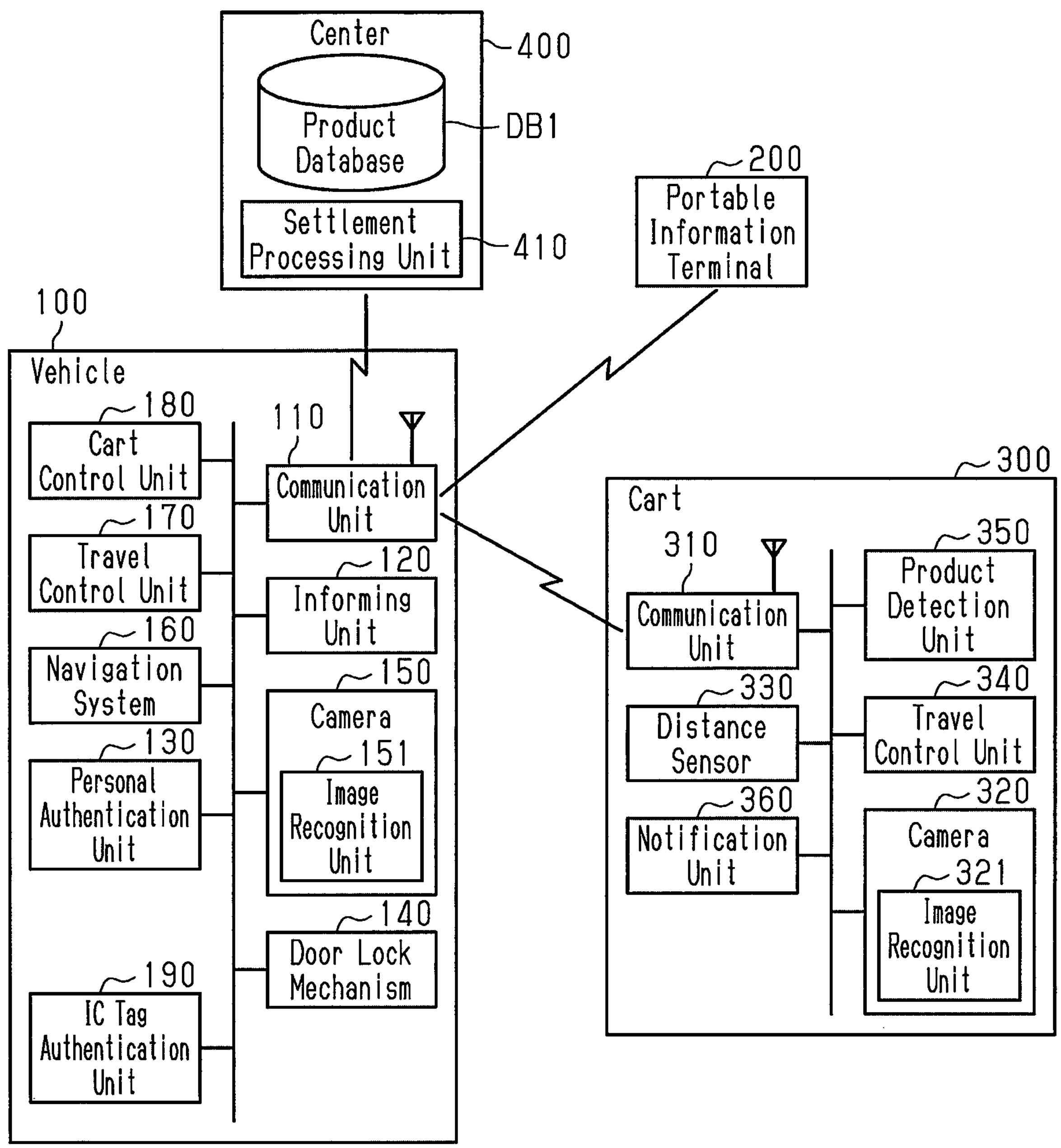
FIG. 8 is a block diagram showing a schematic configuration of a pickup system according to a third embodiment.

As shown in FIG. 8, in the third embodiment, the vehicle 100 includes a communication unit 110, an informing unit 120, a personal authentication unit 130, a door lock mechanism 140, a camera 150, a navigation system 160, a travel control unit 170, a cart control unit 180, and an IC tag authentication unit 190.

The IC tag authentication unit 190 is a non-contact type sensor provided at the entrance of the vehicle 100 and authenticates an IC tag attached to a product to detect the movement of the product from the inside of the vehicle 100 to the outside of the vehicle 100 and the movement of the product from the outside of the vehicle 100 to the inside of the vehicle 100. Furthermore, when detecting the entrance of a product into the vehicle 100, the IC tag authentication unit 190 transmits a detection signal to a cart 300 that is to be loaded with the product. Upon receiving the detection signal from the IC tag authentication unit 190, the cart 300 issues an notification through a notification unit 360 to prompt the user to load the product.

In the third embodiment, a flow of processes when a user, or an exhibitor of a product, loads the product on the vehicle 100 will now be described.

Figure 9:
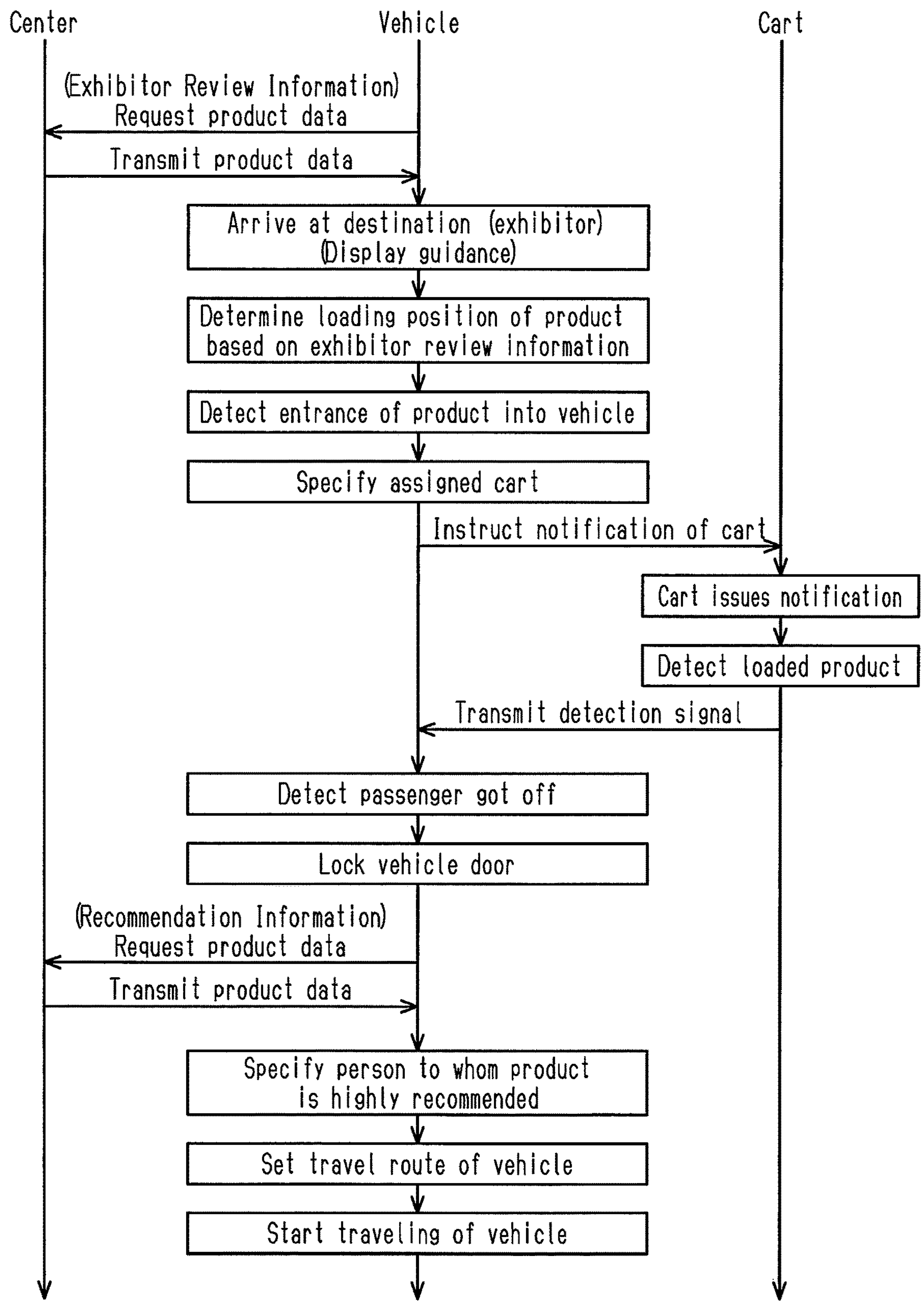
FIG. 9 is a sequence chart showing a flow of processes when a user, or an exhibitor of a product, loads the product onto a vehicle in the pickup system of FIG. 8.

As shown in FIG. 9, the vehicle 100 sends a request to the center 400 for the product data at a point in time before arriving at the destination, or the position of the user, who is the exhibitor of the product. The vehicle 100 acquires the review information of the exhibitor from the product data received from the center 400. When arriving at the position of the user, or the destination, the vehicle 100 provides the user with various kinds of guidance information through the informing unit 120. The provision of the guidance information includes a guidance display of the loading position of the product based on the review information of the exhibitor.

Then, when the entrance of the product into the vehicle 100 is detected through the IC tag authentication unit 190, the vehicle 100 specifies a cart 300 that is to be loaded with the product. The vehicle 100 instructs the specified cart 300 to issue a notification.

When receiving the notification instruction from the vehicle 100, the cart 300 issues a notification through the notification unit 360 to prompt the user to load the product. The notification issued by the notification unit 360 is a display notification or a voice notification.

When detecting that the product is loaded onto the cart 300 through the product detection unit 350, the cart 300 transmits a detection signal to the vehicle 100.

When the loading of the product onto the cart 300 is completed and the user, or the passenger, gets off the vehicle 100, the vehicle 100 switches the vehicle door to the locked state through the door lock mechanism 140.

Thereafter, the vehicle 100 sends a request to the center 400 for the product data managed in the product database DB1. Upon receiving the product data from the center 400, the vehicle 100 acquires personal recommendation information from the received product data.

The vehicle 100 specifies a person to whom the product is highly recommended from people around the vehicle 100 based on the personal recommendation information acquired in the above manner. The vehicle 100 sets the travel route of the vehicle 100 so as to include the position of the specified person and then starts the travelling of the vehicle 100 in accordance with the travel route.

As described above, the third embodiment has the following advantage in addition to the advantages (1) to (3) of the first embodiment.

(5) The notification unit 360 notifies the user of the loading position of the product on the vehicle 100. This allows the user to more effectively load the product.

Fourth Embodiment

A fourth embodiment of a pickup system will now be described. The fourth embodiment is different from the first embodiment in that a person to whom a product candidate is highly recommended is specified in advance and then the travel, route of the vehicle is set. Therefore, in the following description, the configuration that is different from the first embodiment will be mainly explained, and redundant explanation of the configuration same as or equivalent to the configuration in the first embodiment will be omitted.

Figure 10:
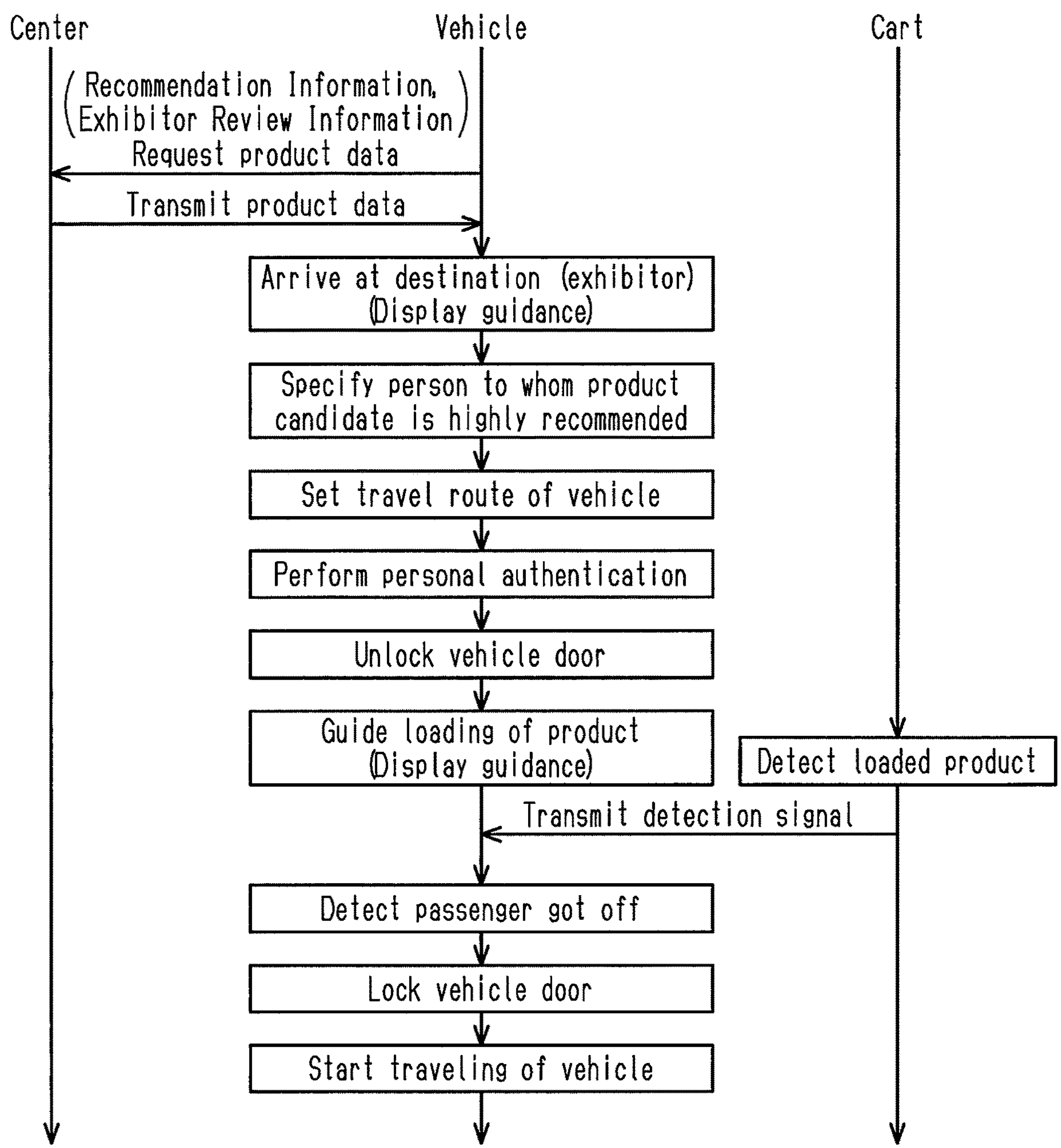
FIG. 10 is a sequence chart showing a flow of processes when a user, or an exhibitor of a product, loads the product onto a vehicle in a pickup system according to a fourth embodiment.

As shown in FIG. 10, the vehicle 100 sends a request to the center 400 for product data at a point in time before arriving at the position of a user, or an exhibitor of a product. The vehicle 100 acquires the review information of the exhibitor and personal recommendation information from the product data received from the center 400. Additionally, when arriving at the position of the user, or the destination, the vehicle 100 provides the user with various kinds of guidance information through the informing unit 120.

The vehicle 100 specifies a person to whom the product candidate is highly recommended through the navigation system 160. The vehicle 100 sets the travel route of the vehicle 100 through the navigation system 160 so as to include the position of the specified person.

Subsequently, the vehicle 100 performs the personal authentication on the user through the personal authentication unit 130.

The vehicle 100 compares information obtained from the user with the information registered in advance. When the personal authentication is completed by this comparison, the vehicle 100 unlocks the vehicle door and permits the user to get on the vehicle 100. When the personal authentication is not completed, the vehicle 100 continues to lock the vehicle door.

The vehicle 100 then guides the loading of the product to the user through the informing unit 120. Here, the mode of guiding the loading of the product includes each example described above.

When detecting that the product is loaded onto the cart 300 through the product detection unit 350, the cart 300 transmits a detection signal to the vehicle 100.

When the loading of the product onto the cart 300 is completed and the passenger gets off the vehicle 100, the vehicle 100 switches the vehicle door to the locked state through the door lock mechanism 140.

The vehicle 100 starts the traveling of the vehicle 100 in accordance with the travel route set as described above. More specifically, the vehicle 100 starts to travel from the position of the exhibitor of the product toward the position of a person suitable to buy the product loaded on the vehicle 100.

As described above, the fourth embodiment has the following advantage in addition to the advantages (1) to (3) of the first embodiment.

(6) The vehicle 100 specifies in advance the person to whom a product candidate is highly recommended and then sets the travel route of the vehicle 100. This may have the effect of providing the vehicle 100 that travels so that the sales of products are enhanced.

Fifth Embodiment

A fifth embodiment of a pickup system will now be described. The fifth embodiment is different from the first embodiment in that a product to be load on the vehicle is determined by setting a travel route of the vehicle in advance and specifying a product highly recommended to a person located on the travel route of the vehicle among product candidates of an exhibitor. Therefore, in the following description, the configuration that is different from the first embodiment will be mainly explained, and redundant explanation of the configuration same as or equivalent to the configuration in the first embodiment will be omitted.

Figure 11:
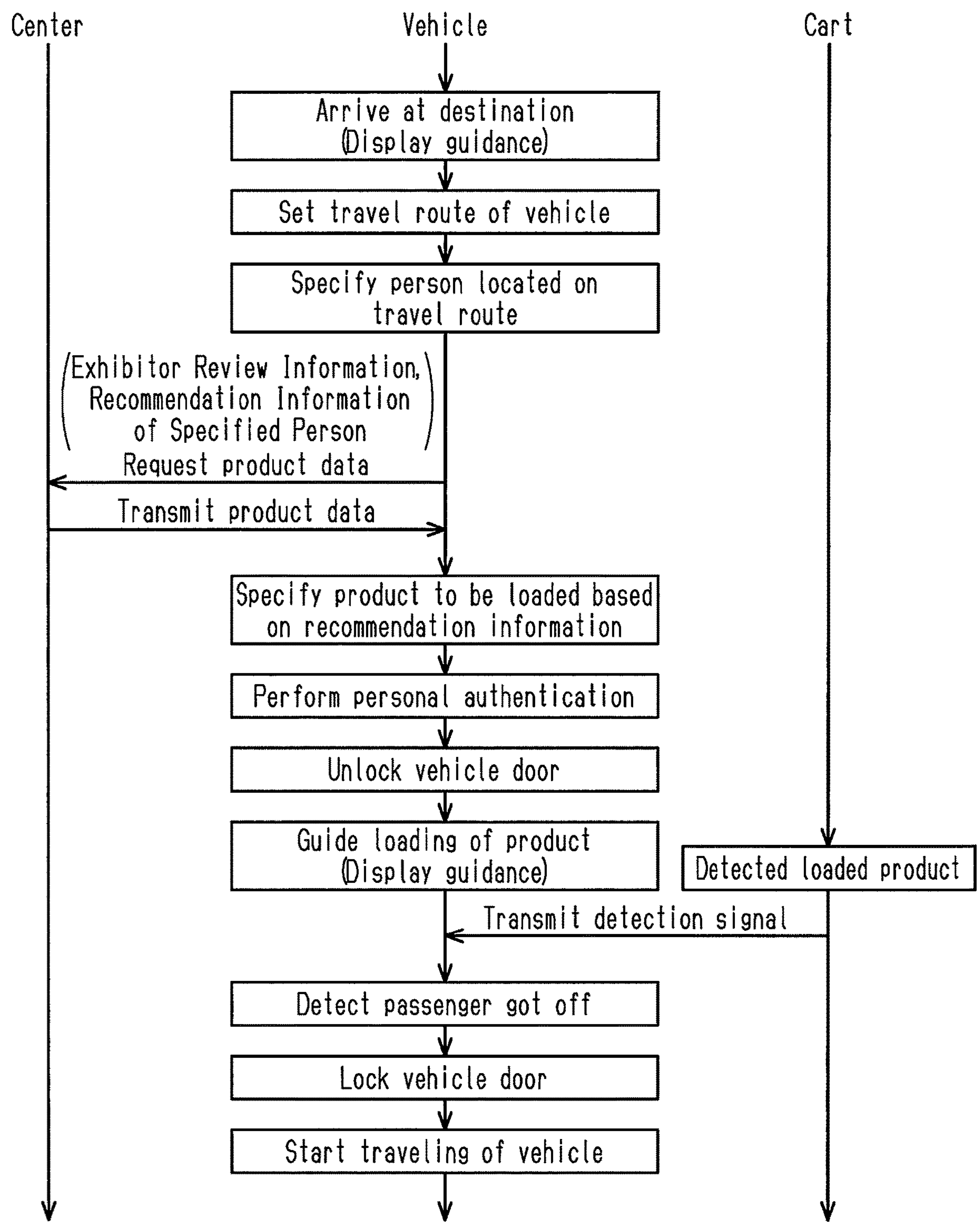
FIG. 11 is a sequence chart showing a flow of processes when a user, or an exhibitor of a product, loads the product onto a vehicle in a pickup system according to a fifth embodiment.

As shown in FIG. 11, when arriving at the destination, or the position of a user who is an exhibitor of the product, the vehicle 100 provides the user with various kinds of guidance information through the informing unit 120.

Then, the vehicle 100 sets the travel route of the vehicle 100 through the navigation system 160. The vehicle 100 specifies a person located on the set travel route.

The vehicle 100 requests the center 400 for the product data including the recommendation information of the specified person and the review information of the exhibitor. Upon receiving the product data from the center 400, the vehicle 100 specifies the product to be loaded on the vehicle 100 based on the recommendation information in the received product data.

Subsequently, the vehicle 100 performs the personal authentication on the user through the personal authentication unit 130.

When the personal authentication is completed, the vehicle 100 unlocks the vehicle door and permits the user to get on the vehicle 100. When the personal authentication is not completed, the vehicle 100 continues to lock the vehicle door.

The vehicle 100 then guides the loading of the product to the user through the informing unit 120. Here, as an example of a mode of guiding the loading of the product, the user may be informed of the position of the cart 300 that is to be loaded with the product.

Upon detecting that the product is loaded onto the cart 300 through the product detection unit 350, the cart 300 transmits a detection signal to the vehicle 100.

When the loading of the product onto the cart 300 is completed and the user, or a passenger, gets off the vehicle 100, the vehicle 100 switches the vehicle door to the locked state through the door lock mechanism 140.

Thereafter, the vehicle 100 starts the traveling of the vehicle 100 in accordance with the travel route set as described above.

As described above, the fifth embodiment has the following advantage in addition to the advantages (1) to (3) of the first embodiment.

(7) The vehicle 100 determines products to be loaded on the vehicle 100 in accordance with the preference of a person located on the travel route of the vehicle 100. This may have the effect of providing the vehicle 100 that travels so that the sales of the products are enhanced.

Other Embodiments

Each of the above-described embodiments may be implemented in the following modes.

In each of the above-described embodiments, the cart control unit 180 controls the arrangement of the carts 300 based on the review information of the exhibitor set for the product when the vehicle 100 arrives at the selling area of the product. Alternatively, the cart control unit 180 may control the arrangement of the carts 300 according to the preferences of another user located around the vehicle 100 when the vehicle 100 arrives at the selling area of the product.

In the second embodiment, when the vehicle 100 arrives at the position of the user, who is the exhibitor of a product, the cart control unit 180 controls the arrangement of the carts 300 based on the review information of the exhibitor set for the product. Alternatively, when the vehicle 100 arrives at the position of the user, who is the exhibitor of a product, the cart control unit 180 may control the arrangement of the carts 300 according to the product sales performance of the exhibitor.

In each of the above-described embodiments, when the vehicle 100 arrives at the position of the user, who is the exhibitor of a product, the cart control unit 180 may arrange the carts 300 without setting any loading priority for the product.

In each of the above-described embodiments, after the vehicle 100 arrives at the selling area of the product, the cart control unit 180 changes the arrangement of the cart 300 loaded with the product. Alternatively, the cart control unit 180 may change the arrangement of the cart 300 loaded with the product before the vehicle 100 arrives at the selling area of the product.

In each of the above-described embodiments, when the vehicle 100 arrives at the selling area of the product, the cart control unit 180 arranges the cart 300 loaded with the product in the vehicle interior. Alternatively, when the vehicle 100 arrives at the selling area of the product, the cart control unit 180 may arrange the cart 300 loaded with the product at the exterior of the vehicle 100. In this case, the vehicle 100 may be provided with a camera for monitoring the situation of the vehicle exterior to prevent theft of the product.

In each of the above-described embodiments, the communication unit 310 of the cart 300 may communicate with the personal authentication unit 130 and the settlement processing unit 410.

In each of the above-described embodiments, when the vehicle 100 arrives at the selling area of the product, the informing unit 120 may display an image of the exhibitor to another user located around the vehicle 100.

In each of the above-described embodiments, when the vehicle 100 arrives at the selling area of the product, the informing unit 120 may display an advertisement corresponding to the preference of another user located around the vehicle 100.

In the first to fourth embodiments described above, the vehicle 100 specifies a person to whom a product or a product candidate is highly recommended and sets the travel route of the vehicle so as to include the position of the specified person. In addition, the vehicle 100 may weigh the recommendation information with respect to the product in view of attribute information such as time of day or weather.

Therefore, the present examples and embodiments are to be considered as illustrative and not restrictive and the disclosure is not to be limited to the details given herein, but may be modified within the scope and equivalence of the appended claims.

The invention claimed is:

1. A pickup system for picking up a product using a vehicle having an autonomous travelling function, the pickup system comprising circuitry configured to:

accept a pickup request from a user;

cause the vehicle to autonomously travel to a user position specified in the pickup request;

inform the user, via information provided on a display of the vehicle that, when the vehicle arrives at the user position, the arrived vehicle is a vehicle that is to pick up the product in response to the pickup request;

move a cart for loading the product in the vehicle or around the vehicle; and control an arrangement of the cart in the vehicle or around the vehicle based on a loading priority set for the product when the vehicle arrives at the user position.

2. The pickup system according to claim 1, wherein the circuitry is configured to inform the user of a location where the product is to be loaded in the vehicle.

3. The pickup system according to claim 1, wherein the circuitry is configured to acquire a product sales history of the user and set the loading priority of the product based on the acquired product sales history.

4. The pickup system according to claim 1, wherein the vehicle is configured to sell the product picked up from the user to another user, and the circuitry is configured to control the arrangement of the cart in the vehicle or around the vehicle based on a sales priority set for the product when the vehicle arrives at a selling area of the product.

5. A method for controlling a pickup system for picking up a product using a vehicle having an autonomous travelling function, the method comprising causing the pickup system to accept a pickup request from a user, cause the vehicle to autonomously travel to a user position specified in the accepted pickup request, inform the user, via information provided on a display of the vehicle that, when the vehicle arrives at the user position, the arrived vehicle is a vehicle that is to pick up the product in response to the pickup request, move a cart for loading the product in the vehicle or around the vehicle, and control an arrangement of the cart in the vehicle or around the vehicle based on a loading priority set for the product when the vehicle arrives at the user position.

6. A pickup system for picking up a product using a vehicle having an autonomous travelling function, wherein the vehicle is configured to sell the product picked up from a user to another user, wherein the pickup system comprises circuitry configured to accept a pickup request from the user, cause the vehicle to autonomously travel to a user position specified in the accepted pickup request, inform the user, via information provided on a display of the vehicle that, when the vehicle arrives at the user position, the arrived vehicle is a vehicle that is to pick up the product in response to the pickup request, move a cart for loading the product in the vehicle or around the vehicle, and control an arrangement of the cart in the vehicle or around the vehicle based on a sales priority set for the product when the vehicle arrives at a selling area of the product.

* * * * *